(12) United States Patent
Joslyn (10) Patent No.: US 6,475,071 B1
(45) Date of Patent: Nov. 5, 2002

(54) CROSS FLOW SLURRY FILTRATION APPARATUS AND METHOD

(75) Inventor: Michael J. Joslyn, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 28 days.

(21) Appl. No.: 09/648,105

(22) Filed: Aug. 25, 2000

(51) Int. Cl.$^7$ .................................................. B24B 1/00
(52) U.S. Cl. ............................. 451/60; 481/28; 481/36; 210/67; 210/190; 210/191; 210/294; 210/314; 210/315
(58) Field of Search ............................... 451/28, 36, 60; 210/167, 190, 191, 294, 295, 297, 314, 315

(56) References Cited

U.S. PATENT DOCUMENTS

| | | | |
|---|---|---|---|
| 3,907,681 A | * | 9/1975 | Corrigan et al. ............... 210/75 |
| 4,647,375 A | * | 3/1987 | Czeller et al. ............... 210/267 |
| 5,013,446 A | * | 5/1991 | Li et al. ...................... 210/635 |

* cited by examiner

Primary Examiner—Joseph J. Hail, III
Assistant Examiner—Shantese McDonald
(74) Attorney, Agent, or Firm—Dorsey & Whitney LLP (57) ABSTRACT

The present invention is directed toward an apparatus and method for the cross flow filtration of polishing slurry compositions used in semiconductor wafer planarization. In one aspect, an apparatus according to the invention includes an elongated cylindrical filter element adapted to be rotated at predetermined angular velocities that is disposed within a cylindrical housing. The housing has an inlet that is fluidly connected to a source of polishing slurry through a pump, an outlet to provide filtered slurry to a planarization machine, and a bypass outlet that is fluidly connected to the source of polishing slurry to allow refiltration of the bypass fluid. A motor is also included to impart rotational motion to the cylindrical filter element. By rotating the filter element in the housing while slurry is flowing through the housing, a fluid shear layer develops on the filter surface that repels larger particles suspended in the slurry from the filter surface, while admitting those of acceptable size to generate a filtered slurry. A portion of the slurry not subject to filtration is routed to the bypass outlet for refiltration.

In an alternate aspect of the invention, the apparatus includes an inner cylindrical filter element and an outer cylindrical filter element that are concentrically disposed within a housing. The filter elements may be independently rotated to achieve multistage filtration of the slurry.

50 Claims, 5 Drawing Sheets

CROSS FLOW SLURRY FILTRATION APPARATUS AND METHOD

TECHNICAL FIELD

This invention relates to chemical-mechanical planarization of semiconductor wafers, and more particularly to slurry filtration systems used in such machines.

BACKGROUND OF THE INVENTION

Chemical Mechanical Planarization (CMP) is the preferred technique for globally planarizing semiconductor wafers at high levels of integration. In CMP, the semiconductor wafer is generally mounted in a wafer carrier disposed above a polishing pad that is attached to a rotatable platen. The exposed surface of the wafer is then pressed against the polishing pad with a prescribed down force, and the polishing pad and/or the wafer are then independently rotated while the wafer carrier is translated across the pad surface. While the semiconductor wafer is moved across the polishing pad, a polishing slurry is distributed across the surface of the pad to facilitate planarization of the wafer. The slurry is generally comprised of a combination of chemical etchants and very highly abrasive particles in a liquid suspension to simultaneously etch and abrade the wafer surface as it moves across the pad. Polishing slurry compositions commonly used in wafer planarization are generally comprised of abrasive compounds such as colloidal silicon dioxide or a dispersoid of alumina with particle sizes in the 0.01–0.3 micron range. Suitable chemical agents for etching the wafer are generally chemical compounds such as potassium hydroxide or ammonium hydroxide.

A significant problem encountered in CMP is surface damage to the wafer due to relatively large abrasive particles that scratch the surface of the wafer. This problem is partially addressed during the slurry manufacturing process, since the abrasive particles that comprise the slurry are sized so that abrasive particles of sufficient size to cause wafer scratching are eliminated. In a typical polishing slurry, however, abrasive particles that are unacceptably large may still be encountered, since the sizing procedure may not exclude all of the abrasive particles of unacceptable size. These abrasive particles, commonly referred to as "tails", generally exist in slurry formulations in proportion to the cost of the formulation because a reduction in the number of tail particles requires that the abrasive particle sizing be more rigidly controlled when the slurry is formulated.

The occurrence of surface scratching particles also results from abrasive particles that combine, or agglomerate, in the slurry to form particles that have an effective size significantly outside the range of acceptability. Thus, surface-scratching agglomerations may form even where the population of tail particles is very rigidly controlled. The absence of sufficient fluid motion in the slurry has been identified as a significant contributor to the formation of abrasive particle agglomerations, since the abrasive particles tend to settle out of the suspension unless the slurry is subjected to some fluid movement.

Figure 1:
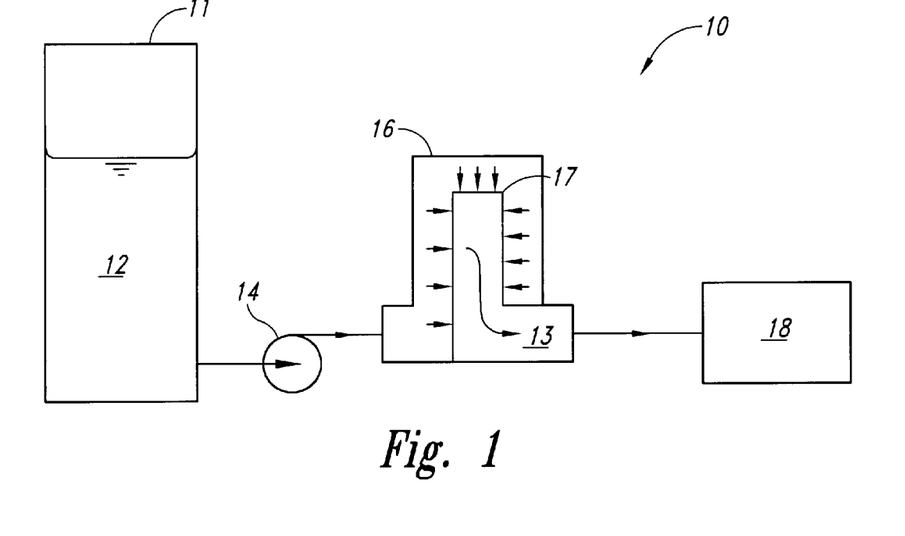
FIG. 1 is a schematic view of a slurry distribution system in accordance with the prior art.

To minimize the possibility of wafer surface scratching due to the presence of tails or agglomerated particles, prior art polishing slurry distribution systems have used fluid filters to trap particles of unacceptable size before the slurry is deposited on the polishing pad of the planarization machine. FIG. 1 shows a typical polishing slurry distribution system according to the prior art. As shown therein, the polishing slurry 12 is retained within a storage tank 11. The slurry 12 is then pumped from the storage tank 11 by a pump 14, and delivered to the fluid filter 16, where the polishing slurry 12 passes through a filter element 17 in a flow direction substantially perpendicular to the surface of filter element 17. After flowing through the filter element 17, the slurry 12 emerges as the filtered slurry 13 that is devoid of either tails or agglomerated abrasive material. The filtered slurry 13 may then be supplied to the wafer planarization machine 18 to be consumed during the wafer planarization process.

A principal shortcoming inherent in the prior art slurry distribution system 10 resides in the fluid filter 16. As shown in FIG. 1, the filter element 17 is generally comprised of a fine interwoven network of polypropylene fibers with open flow areas between the fibers to allow the passage of particles up to a prescribed particle size, and to retain those of larger size. As trapped particles steadily occlude the open areas in the filter element 17, it becomes increasingly restrictive to the flow of slurry, thus limiting the flow of slurry to the planarization pad. Because the flow of slurry continuously deteriorates as slurry flows through the filter 16, continual readjustments to the wafer planarization procedure must be made in order to achieve consistent planarization results. When the flow of slurry is restricted to minimally sufficient levels, the fluid filter 16 (or more generally, the filter element 17) must be removed and replaced. As a consequence, frequent replacement of the filter element 17 commonly occurs in order to achieve a reasonably uniform flow of slurry to the pad over successive wafer planarizations, and to avoid the occurrence of an insufficient slurry flow during any wafer planarization process.

Accordingly, the frequent removal and replacement of the fluid filter 16 makes the wafer more expensive to produce, due to the occurrence of equipment downtime required for servicing the filter, in addition to the cost of the replacement filters.

The problems associated with particle occlusion of the fluid filter 16, as described above, are further exacerbated when slurry compositions are used which have large numbers of tail particles. As briefly described above, slurry compositions that contain a greater number of tail particles are generally less expensive to manufacture. Consequently, an economic incentive exists to utilize these compositions in wafer planarization. Prior art slurry distribution systems, however, have not fully permitted the use of these lower cost slurry formulations, since the useful life of the fluid filter would be substantially shortened. Accordingly, the full economic benefit to be derived from the use of these slurry formulations in wafer planarization has not been realized.

SUMMARY OF THE INVENTION

The present invention is directed toward an apparatus and method for the cross flow filtration of polishing slurry compositions used in semiconductor wafer planarization. An apparatus according to one aspect of the invention includes an elongated cylindrical filter element adapted to be rotated at predetermined angular velocities that is disposed within a housing. The housing has an inlet that is fluidly connected to a source of polishing slurry through a pump, an outlet to provide filtered slurry to a planarization machine, and a bypass outlet that is fluidly connected to the source of polishing slurry to allow refiltration of the bypass fluid. A motor is also included to impart rotational motion to the cylindrical filter element. By rotating the filter element in the housing while slurry is flowing through the housing, a fluid shear layer develops on the filter surface that repels larger particles suspended in the slurry from the filter surface, while admitting those of acceptable size to generate a filtered slurry. A portion of the slurry not subject to filtration is routed to the bypass outlet for refiltration.

In an alternate aspect of the invention, the apparatus includes an inner cylindrical filter element and an outer cylindrical filter element that are concentrically disposed within a housing. The filter elements may be independently rotated to achieve multistage filtration of the slurry.

In the drawings, like reference numbers identify similar elements or steps. For ease in identifying the discussion of any particular element, the most significant digit in a reference number refers to the Figure number in which the element is first introduced (e.g., element 24 is first introduced and discussed with respect to FIG. 2).

DETAILED DESCRIPTION OF THE INVENTION

The present invention is generally directed to an apparatus and method of slurry flow filtration. Many of the specific details of certain embodiments of the invention are set forth in the following description and in FIGS. 2 through 6 to provide a thorough understanding of such embodiments. One skilled in the art will understand, however, that the present invention may have additional embodiments, or that the present invention may be practiced without several of the details described in the following description. In addition, it is understood that terms of art such as "polishing slurry" or "slurry" pertain to fluids that contain abrasive particles that are used in semiconductor wafer planarization.

Figure 2:
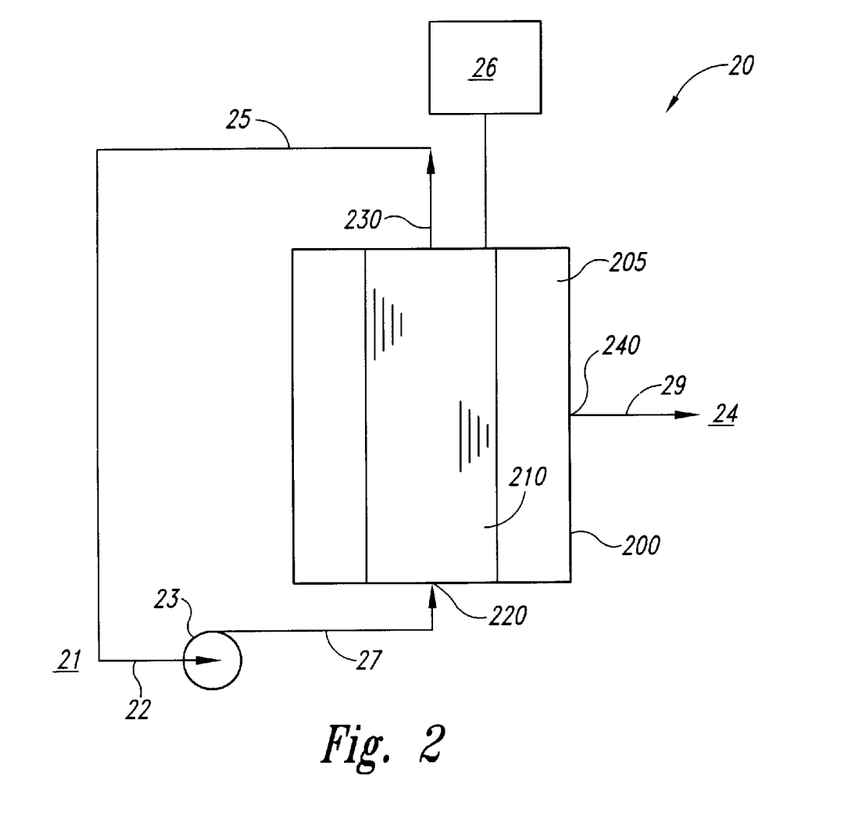
FIG. 2 is a schematic view of a cross flow slurry filter apparatus in accordance with an embodiment of the invention.

FIG. 2 is a schematic representation of a polishing slurry filter 20 according to one embodiment of the invention. As shown therein, the polishing slurry filter 20 is comprised of a housing 200 to sealably contain slurry, and a fluid filter element 210 in the housing 200 that is capable of rotational movement relative to the housing 200. The housing 200 is further comprised of an inlet port 220, an outlet port 240, and a bypass port 230. An actuator 26 rotates the internal fluid filter element 210.

Still referring to FIG. 2, the operation of the filter 20 will now be described. A source of unfiltered polishing slurry 21 is propelled by a pump 23 through a supply line 22. Slurry is then transported to the inlet port 220 of the housing 200 by a line 27 to fill the housing 200 with slurry. When the filter element 210 is rotated by the actuator 26, a fluid shear layer (not shown) develops on a surface of the filter element 210, which, in turn, allows the larger particles to be repelled away from the filter surface. In response to the pressure imposed by pump 23, the small particles in suspension that are adjacent to the filter element 210 pass though the element, while the larger particles are collected on the surface of the filter element 210. Accordingly, filtered slurry moves through the element 210 into the annular space 205. Due to the pressure gradient imposed by the pump 23, the filtered slurry leaves the housing 200 at an outlet port 240, and is transported to the planarization machine 24 through a line 29. Slurry that contains the larger, wafer scratching abrasive particles leaves the housing 200 through the bypass port 230. The slurry leaving the housing 200 at the bypass port 230 may be discarded, or alternatively, it may be routed through a bypass line 25 to be reintroduced into the supply line 22. This alternative configuration is regarded as particularly advantageous since the bypassed slurry contains potentially filterable polishing slurry.

Figure 3:
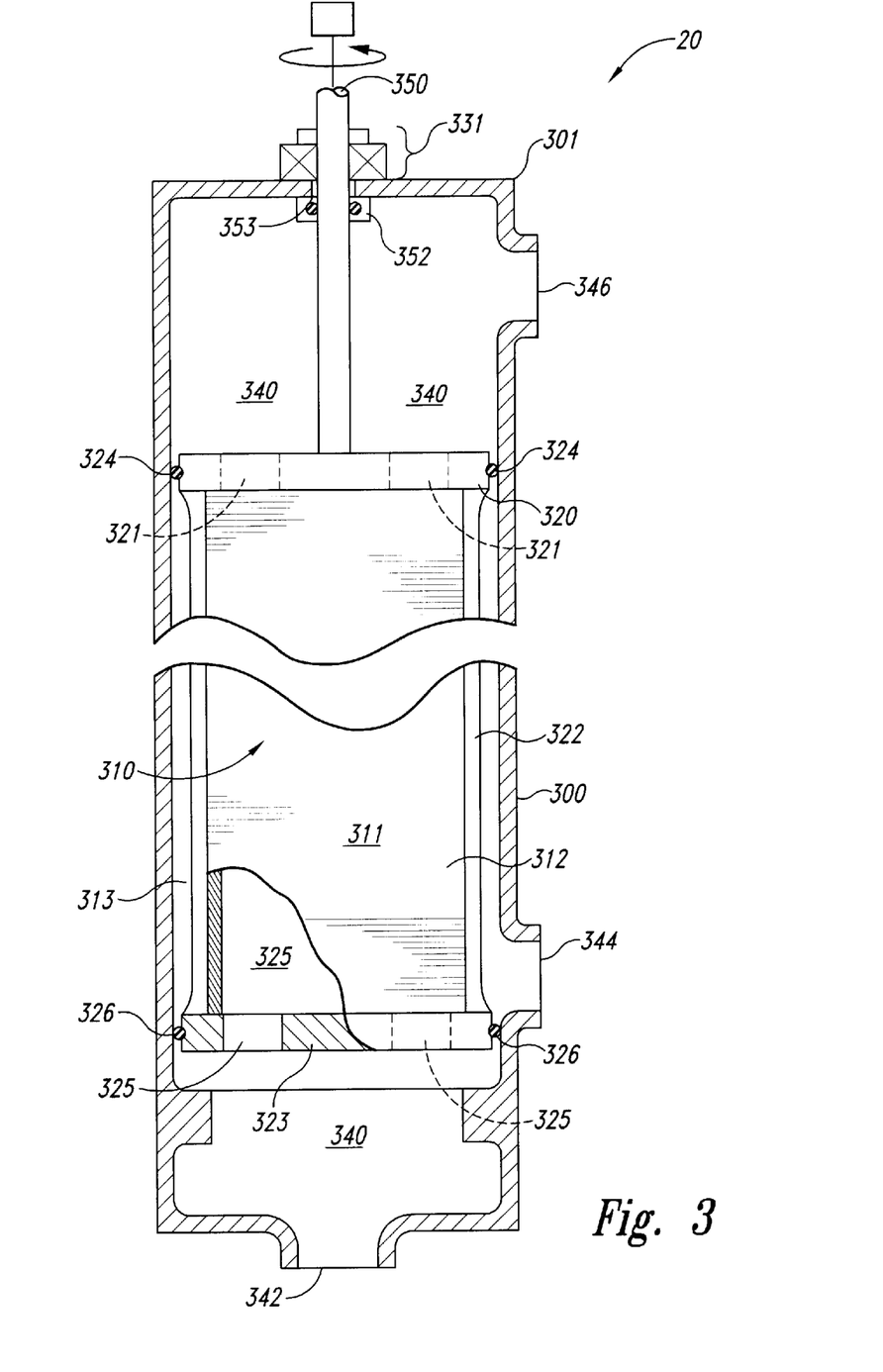
FIG. 3 is a cross sectional view of the cross flow slurry filter apparatus in accordance with an embodiment of the invention.

An embodiment of the polishing slurry filter 20 will now be described in greater detail. Referring to FIG. 3, the filter 20 includes a cylindrical housing 300 that is a substantially cylindrical in shape with an inlet port 342, an outlet port 344, and a bypass port 346. The inlet port 342 is fluidly connected with a source of polishing slurry through a pump (not shown), and the bypass port 344 is fluidly connected to the source of polishing slurry through a bypass line (also not shown). The cylindrical housing 300 also includes a drive shaft opening 353 that allows the input of motive power to a filter assembly, which will be described in greater detail below.

The cylindrical housing 300 may be constructed of metal, or any substantially rigid thermoplastic material, such as nylon, and may be comprised of a casting that is subsequently subjected to machining processes to form he structures identified, or it may be formed entirely by machining processes.

Positioned within the cylindrical housing 300 is a rotating filter assembly 310 of substantially cylindrical shape that is contained within the interior of the housing 300. The filter assembly 310 further includes a filter element 311 positioned on the filter assembly 310 to define a cylindrical filtration surface 312 and an interior fluid cavity 325. The filter element 311 is preferably comprised of a polypropylene filter material suitable for the filtration of CMP slurry materials. Polypropylene filter materials that may be used in this embodiment are available from the Millipore Corporation of Bedford, Mass., although other filtration materials may be equally suitable.

The upper end of the cylindrical filtration surface 312 is enclosed by a circular upper end plate 320 that includes a plurality of flow openings 321. Attached to the upper end plate 320 is a drive shaft 350 that is rigidly and concentrically connected to the upper end plate 320. A fluid seal 324 that is capable of rotation is positioned about the upper end plate 320 to prevent the flow of fluid thereby. Although the fluid seal 324 may be comprised of an elastomeric o-ring disposed within a retaining groove in the upper end plate 320, a number of alternative fluid sealing devices may be used. For example, the fluid seal 324 may be a fluid labyrinth seal.

The lower end of the cylindrical filtration surface 312 is enclosed by a lower end plate 323 that is substantially similar in size and shape to the upper end plate 320, and also includes a plurality of flow openings 325. A fluid seal 326 prevents the flow of fluid past the lower end plate. The upper end plate 320 and the lower end plate 323 may be constructed of metal, or alternatively, from a substantially rigid thermoplastic material such as nylon, or some other equivalent material.

The upper end plate 320 and the lower end plate 323 are connected by a plurality of support members 322 that extend longitudinally along the cylindrical filtration surface 312 to provide support for the filter element 311. The supports are positioned between the upper end plate 320 and the lower end plate 323 at selected radial locations about end plates 320 and 323.

The rotating filter assembly 310 is supported within the cylindrical housing 300 by a top bearing assembly 331 that retains drive shaft 350, and is capable of supporting the thrust load due to the weight of the filter assembly 310. A shaft seal 352 is located adjacent to drive shaft opening 353 to prevent the migration of polishing slurry into the bearing assembly 331. The bearing assembly 331 may be comprised of a simple journal bearing, or alternatively, more complex bearings, such as antifriction bearings may be used.

A motor 351 is attached to drive shaft 350 to rotate the filter assembly 310. The motor 351 is preferably an electric motor, but other alternative means are equally applicable. For example, the motor 351 may be a fluid operated motor, or alternatively, the rotating filter assembly 310 may be remotely driven by magnetically coupling an external drive apparatus to a ceramic radial disk magnet fixedly attached to elongated filter assembly. Moreover, the motor 351 may be dedicated to providing motive power to more than a single device. For example, the motor 351 may be used to simultaneously drive the rotating filter assembly 310 and the pump 23 that transports slurry to the cross flow filter 30.

Figure 4:
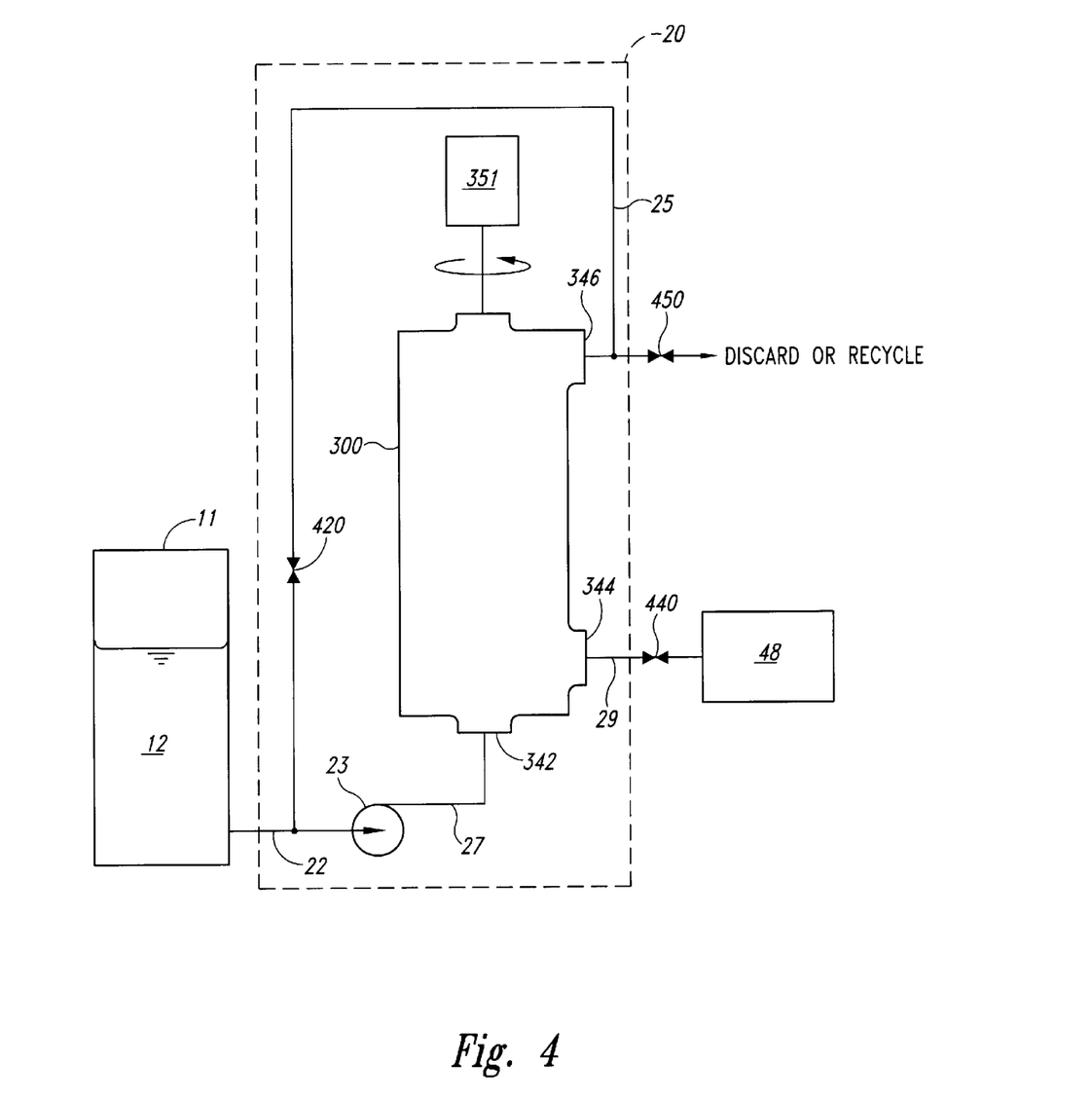
FIG. 4 is a schematic view of the cross flow slurry filter in accordance an embodiment of the invention.

The operation of the cross flow slurry filter 20 will now be discussed in connection with FIGS. 3 and 4. Turning to FIG. 4, the cross flow filter 20 is shown in fluid communication with a storage tank 11 that contains a volume of polishing slurry 12. The filter 20 is also in fluid communication with a planarization machine 48. As shown therein, a volume of polishing slurry 12 is drawn from a storage tank 11 through the line 22 by the pump 23, which transports slurry to the cross flow filter 20 though the line 27. Turning now to FIG. 3, the slurry enters input port 342 in the cylindrical housing 300 and then enters the interior cavity 325 through flow openings 325 in the lower end plate 323. A shear layer develops on the interior surface of filter element 310 due to the rotation of the element 310, and the flow of slurry through the interior cavity 325. Accordingly, the particle concentration gradient described previously is established on the interior surface of filter element 310, and abrasive particles of selected size will pass through the filter element 310 and into the annular space 313 in response to the pressure imposed by pump 23. The filtered slurry then leaves the annular space 313 through the exit port 344 for delivery to a planarization machine 48 through line 29 (as shown in FIG. 4). The portion of the slurry not subjected to filtration leaves the rotating filter assembly 310 through fluid passages 321, leaving the cylindrical housing 300 through the bypass opening 346.

In contrast to conventional slurry filters, the filter 20 does not filter all of the slurry that enters the filter because only a portion of the fluid entering the interior cavity 325 is capable of interacting with the fluid shear layer that develops on the inner surface of the filter element 310. As a result, the slurry that leaves the filter 20 through bypass opening 346 contains slurry that is potentially filterable, together with the larger particles that were excluded by the filtration process. This slurry may accordingly be subjected to repeated filtration within the filter 20 to recover the filterable slurry.

Referring again to FIG. 4, the repeated filtration of slurry will be described in greater detail. According to the foregoing description, a mixture of filterable slurry containing elevated amounts of larger abrasive particles emerges from the housing 300 at bypass port 346 and enters the line 25. The mixture may be selectively discarded through valve 450, but preferably, the mixture is routed to the inlet of pump 23 through line 25 to be refiltered to recover additional amounts of filterable slurry. A valve 420 is optionally included in line 25 so that the fluid pressure and residence time of slurry within the cross flow filter 20 may be controlled.

An additional advantage in recirculating the slurry around the bypass line 25 is that it may be advantageously employed as a recirculation loop for maintaining fluid motion within the system when the flow of slurry to the planarization machine 48 is interrupted by closing valve 440. Turning to FIG. 4, it is seen that when valve 440 is closed, slurry will continue to circulate about the continuous loop formed by lines 25 and 27, with fluid motion provided continuously by pump 23. As mentioned above, maintaining fluid motion within a slurry distribution system significantly inhibits the formation of abrasive agglomerations, and such recirculation loops are well known in the art. For example, U.S. Pat. No. 5,993,647 to Huang, et al. describes a flow recirculation loop that contains a slurry filter. However, the filter disclosed in the Huang reference is not a cross flow filter and is thus incapable of providing the operational advantages as described herein.

Figure 5:
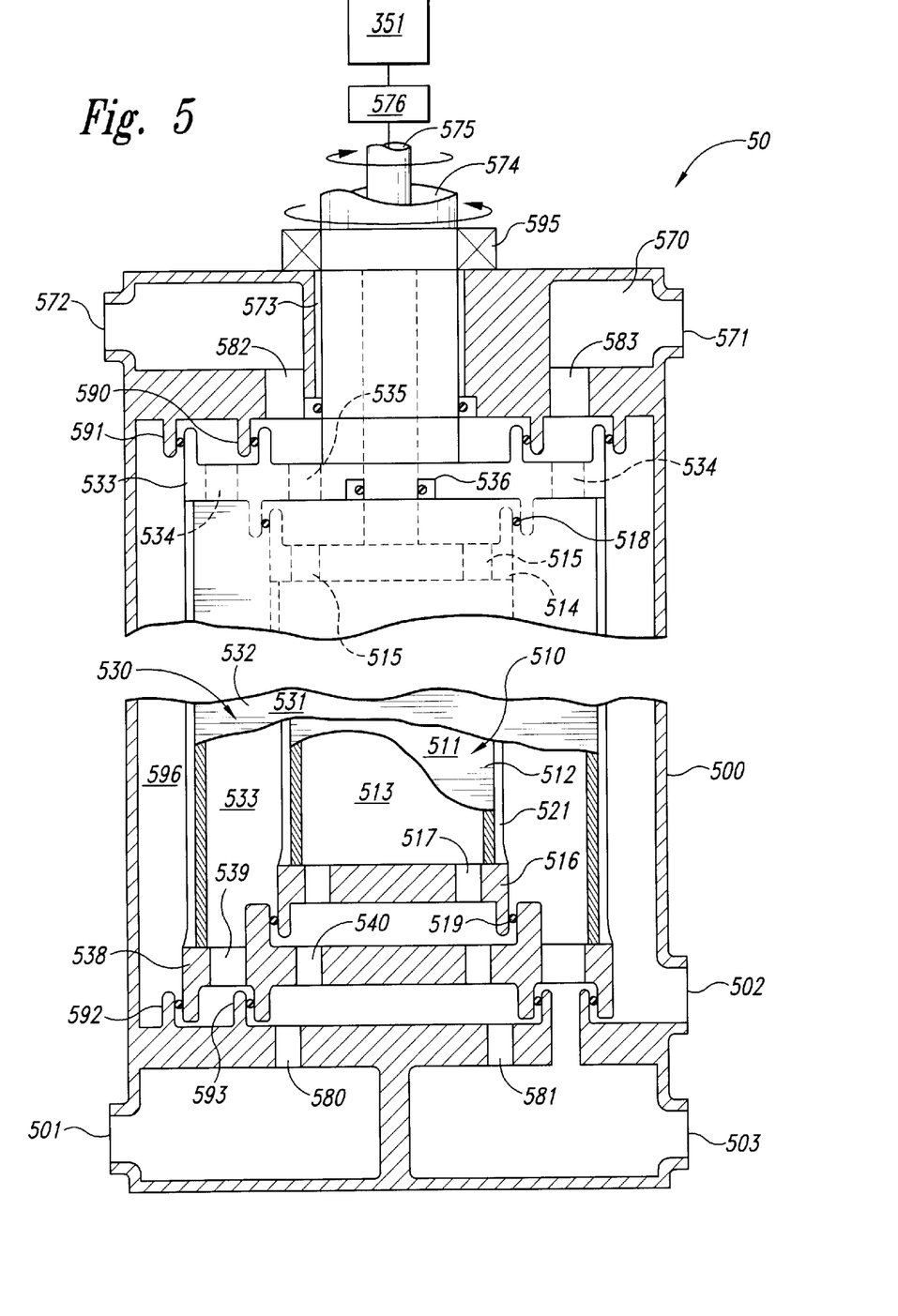
FIG. 5 is a cross sectional view of a cross flow slurry filter apparatus in accordance with another embodiment of the invention.

FIG. 5 is a partial cross-sectional view of a cross flow filter 50 in accordance with an alternate embodiment of the invention. In this embodiment, an apparatus capable of multiple stages of slurry filtration is described, although for clarity of presentation, an apparatus capable of only two successive stages of slurry filtration will be shown. As shown in FIG. 5, the cross flow filter 50 includes a housing 500 that is substantially cylindrical in shape with an inlet port 501, an outlet port 502, a bypass port 572, an intermediate inlet port 503 and an intermediate outlet port 571, which are integrally formed with the housing 500. The inlet port 501 is fluidly connected to a source of polishing slurry through a pump (not shown), and the bypass port 572 is fluidly connected to the source of polishing slurry through a bypass line (not shown). The intermediate inlet port 503 and the intermediate outlet port 571 are also fluidly connected in this embodiment. The cylindrical housing 500 further includes a drive shaft opening 573, and additional internal flow openings 580–583 to allow fluid flow from the internal filtration assemblies to the ports 501, 503, 571 and 572.

Positioned within the cylindrical housing 500 is an inner rotating filter assembly 510 that is contained within an outer rotating filter assembly 530. The inner rotating filter assembly 510 and the outer rotating filter assembly 530 are constructed in a manner substantially similar to the rotating filter assembly 310 described in the previous embodiment, and will now be described more fully. The inner rotating filter assembly 510 includes a filter element 511 positioned on the inner rotating filter assembly 510 to define an inner cylindrical filtration surface 512, and an inner interior fluid cavity 513. As in the previous embodiment, the filter element 511 is preferably comprised of a polypropylene filtration material, although other materials capable of fluid filtration may be used.

The upper end of the inner cylindrical filtration surface 512 is enclosed by an inner upper end plate 514 that is circular in shape and includes a plurality of flow openings 515. Attached to the inner upper end plate 514 is an inner drive shaft 575 that is rigidly and concentrically connected to the inner upper end plate 514. A fluid seal 518 is disposed about the outer periphery of the inner upper plate 514 to prevent fluid passage between the inner rotating filter assembly 510 and the outer rotating filter assembly 530. The lower end of the cylindrical filtration surface 512 is enclosed by an inner lower end plate 516 that is substantially similar in size and shape to the inner upper end plate 514, and which includes flow openings 517. A fluid seal 519 is similarly disposed about the outer periphery of the inner lower plate 514 to prevent fluid passage between the inner and outer rotating filter assemblies. The inner upper end plate 514 and the inner lower end plate 516 are connected by a plurality of support members 521 that extend longitudinally along the inner cylindrical filtration surface 512 to support the filter element 511.

The outer rotating filter assembly 530 is similar in construction to the inner rotating filter assembly 510, and also includes a filter element 531 positioned on the outer rotating filter assembly 530 to define an outer cylindrical filtration surface 532, and an outer interior space 533.

The filter element 531 is also preferably comprised of a polypropylene filtration material, however, the porosity of filter elements 511 and 531 may be different. For example, filter element 511 may be comprised of a material with larger open flow areas to permit the passage of larger abrasive particles, while filter element 531 is comprised of a material with somewhat more restricted open flow areas, to inhibit the passage of a portion of the abrasive particles passed by filter element 511.

The upper end of the outer cylindrical filtration surface 532 is enclosed by an outer upper end plate 533 that includes a plurality of outer flow openings 534 and inner flow openings 535. Attached to the outer upper end plate 533 is an outer drive shaft 574 that is rigidly and concentrically connected to the outer upper end plate 533 which also allows the inner drive shaft 575 to rotate therein. A shaft fluid seal 536 is located in the outer upper end plate 533 to prevent the migration of fluid into the clearance space between the outer drive shaft 574 and the inner drive shaft 575. An inner upper fluid seal 590 is disposed on the outer upper plate 533 to prevent fluid passage into the outer interior space 533. An outer upper fluid seal 591 is similarly disposed on the outer upper plate 533 to restrict fluid passage between the outer interior space 533 and the outer annular space 596. The outer drive shaft 574 and inner drive shaft 575 may be supported by a bearing 595 attached to the housing 500.

The lower end of the outer cylindrical filtration surface 532 is enclosed by an outer lower end plate 538 that is substantially similar in size and shape to the outer upper end plate 533, that includes a plurality of outer flow openings 539 and inner flow openings 540. The outer lower end plate 533 also includes an inner lower fluid seal 593 and an outer lower fluid seal 592 to similarly restrict fluid passage between the outer interior space 533 and the outer annular space 596.

As in the previous embodiment, a motor 351 is attached to the apparatus 50. In this embodiment, however, the inner rotating filter assembly 510 and the outer rotating filter assembly 530 must be capable of simultaneous rotation, and preferably be rotated in opposite directions and at differing rotational speeds. To achieve simultaneous counter-rotation of assembly 510 and assembly 530, a transmission 576 capable of providing the required rotational directions and speeds is interposed between the motor 351 and the outer drive shaft 574 and inner drive shaft 575. Alternatively, the motor 351 may be comprised of a first radial disk magnet fixedly attached to the inner filter assembly 510, and a second radial disk magnet fixedly attached to the outer filter assembly 530 which magnetically couple with a first and second magnetic drives, respectively.

Figure 6:
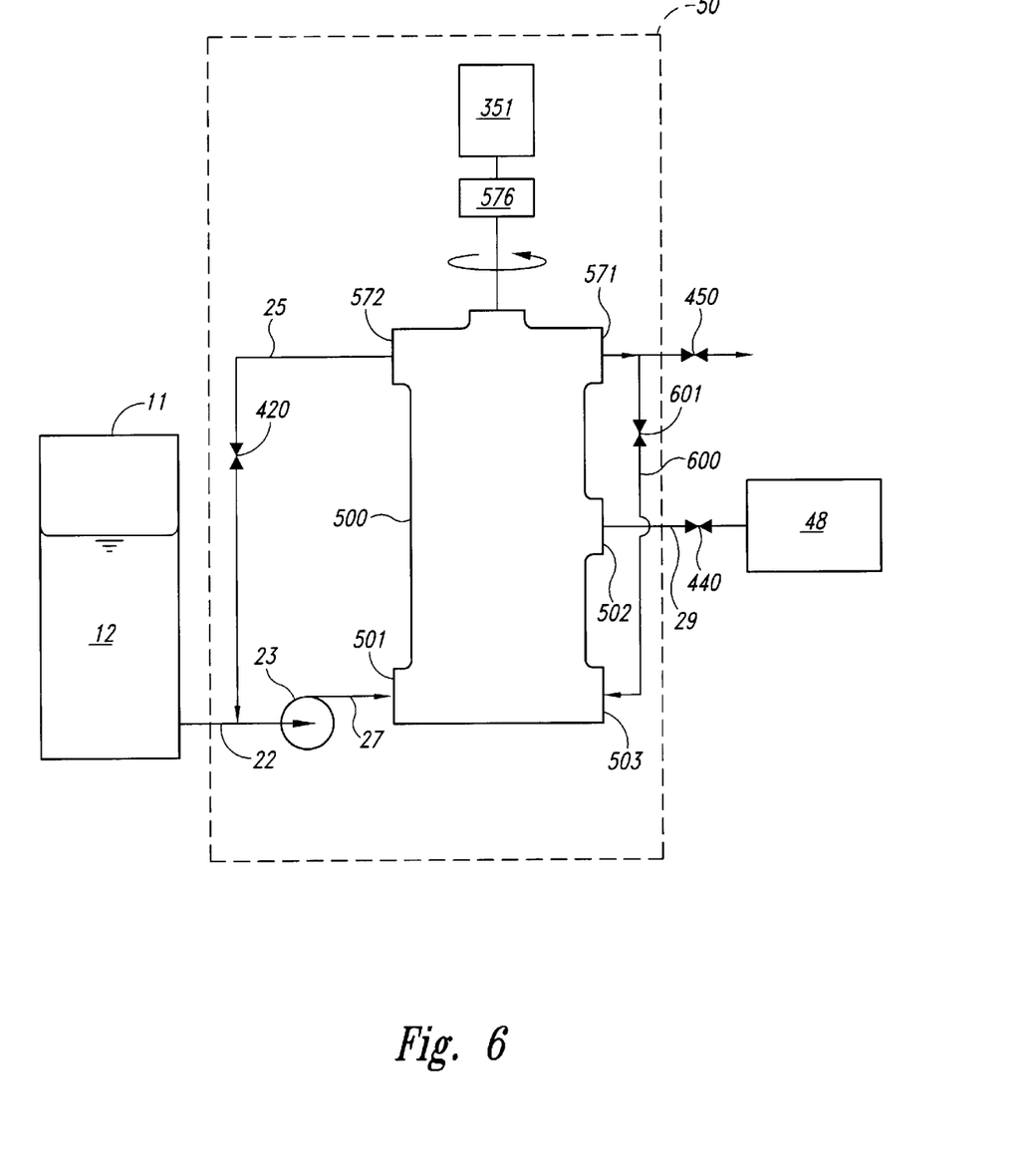
FIG. 6 is a schematic view of a cross flow slurry filter apparatus in accordance with another embodiment of the invention.

The operation of the multistage cross flow filter 50 will now be discussed with reference to FIGS. 5 and 6. Turning to FIG. 6, the multistage cross flow filter 50 is shown in fluid communication with a storage tank 11 that contains a volume of polishing slurry 12. The filter 50 is also in fluid communication with a planarization machine 48. Polishing slurry 12 is drawn from the storage tank 11 through line 22 by the pump 23, which transports slurry to the multistage cross flow filter 50 though the line 27. Returning now to FIG. 5, the slurry filtration processes internal to the filter 50 are described. The slurry 12 enters the input port 501 and passes through internal opening 580 in the cylindrical housing 500. The slurry then proceeds through opening 540 in the outer lower end plate 538 and into the inner interior cavity 513. Since the inner rotating filter assembly 510 is in motion, fluid filtration in the manner previously described takes place across the inner cylindrical filtration surface 512 and enters the outer interior space 533. Slurry that is not filtered at the inner cylindrical filtration surface 512 passes out of the inner rotating filter assembly 510 through the flow opening 515, and proceeds through the flow opening 535 in the outer upper end plate 533 to the flow opening 582 to exit the filter 50 at bypass port 572. Briefly turning to FIG. 6, the unfiltered slurry that leaves the filter 50 at bypass port 572 may be recycled through filter 50 by transporting the slurry along bypass line 25 to the inlet of pump 23. A valve 420 is provided in line 25 to control the fluid pressure and residence time of slurry in the inner interior space 513. Returning now to FIG. 5, the slurry that has passed through the inner cylindrical filtration surface 512 and occupies the outer interior space 533 is of intermediate quality, and is subject to an additional stage of filtration at the outer rotating filter assembly 530, since the outer rotating filter assembly 530 is simultaneously in motion. Slurry that passes through the outer cylindrical filtration surface 532 is thus fully filtered, and leaves the filter 50 though the exit port 502, whereupon it may delivered to a planarization machine 48 through line 29 (as shown in FIG. 6). Slurry that is not filtered at the outer cylindrical filtration surface 532 leaves the outer interior space 533 through flow opening 534 in the outer upper end plate 533 and through flow opening 583 to exit the filter 50 at the intermediate outlet port 571. Referring again to FIG. 6, the slurry that leaves intermediate outlet port 571 may be transported to the intermediate inlet port 503 along the line 600 for recycling through the filter 50. Line 600 further includes a valve 601 to control the pressure and residence time of the slurry in the outer interior space 533. A portion of the slurry at this intermediate stage may also be removed through valve 450 for use in other planarization processes.

Still referring to FIG. 6, the line 600 may be incorporated as an integral part of the cylindrical housing 500 to eliminate the external flow path depicted in FIG. 6. Further, an optional pump in line 600 may be used to augment the pressure difference across the outer cylindrical filtration surface 532.

The above description of illustrated embodiments of the invention is not intended to be exhaustive or to limit the invention to the precise form disclosed. While specific embodiments of, and examples of, the invention are described in the foregoing for illustrative purposes, various equivalent modifications are possible within the scope the invention, as those skilled in the relevant art will recognize.

Moreover, the various embodiments described above can be combined to provide further embodiments. For example, a plurality of filter devices capable of a single stage of filtration, as described in an embodiment of the invention as the filter 20, may be combined with other similar devices in a series flow arrangement to achieve multiple stages of slurry filtration. In addition, the housing and the filter assembly may be tapered, rather than having a cylindrical form. Finally, the unfiltered slurry may first be introduced into the annular space, and emerge as filtered slurry from the interior volume of the filter assembly. Accordingly, the invention is not limited by the disclosure, but instead the scope of the invention is to be determined entirely by the following claims.

What is claimed:

1. A rotary filtration apparatus for the filtering of an abrasive polishing slurry contained within a storage volume, comprising:

an elongated filter assembly having a first end, a longitudinal central axis of rotation, a second end, and a substantially cylindrical filter surface of controlled porosity positioned therebetween to define an interior volume;

a housing having an inlet opening, an outlet opening, and a bypass opening, and further having an internal cavity of sufficient size to accommodate the filter assembly therein, the filter assembly being positioned within the cavity to define an annular volume within the cavity and having the interior volume in fluid communication with the inlet opening through the first end, the bypass opening in fluid communication with the interior volume through the second end, and the outlet opening being in fluid communication with the annular volume;

a drive unit structured to rotate the filter assembly about the central axis of rotation;

a bypass line in fluid communication with the bypass opening and the storage volume to transport slurry therebetween;

a supply line in fluid communication with the storage volume and the inlet opening; and a pump positioned in the supply line to transport the slurry from the storage volume to the inlet opening of the housing.

2. The apparatus according to claim 1 wherein the cylindrical filter surface is further comprised of polymeric material with controlled porosity.

3. The apparatus according to claim 2 wherein the polymeric material is polypropylene.

4. The apparatus according to claim 2 wherein the controlled porosity is greater than about 0.01 micron.

5. The apparatus according to claim 1 wherein the filter assembly is further comprised of a plurality of longitudinal support members positioned between the first end and the second end.

6. The filter assembly according to claim 1 wherein the first and second ends are further comprised of a plurality of flow passages projecting through the first and second ends in a direction substantially parallel to the longitudinal central axis of rotation.

7. The filter assembly according to claim 6 wherein the first and second ends are further comprised of a sealing element concentrically disposed on the first and second ends.

8. The filter assembly according to claim 7 wherein the sealing element is comprised of an elastomeric o-ring.

9. The filter assembly according to claim 7 wherein the sealing element is comprised of a labyrinth fluid seal.

10. The apparatus according to claim 1 wherein the drive unit is further comprised of a radial disk magnet fixedly attached to the filter assembly that magnetically couples to an external magnetic drive.

11. The apparatus according to claim 1 wherein the filter assembly is further comprised of a drive shaft fixedly coupled to the second end.

12. The apparatus according to claim 11 wherein the drive unit is further comprised of an electric motor coupled to the drive shaft.

13. The apparatus according to claim 11 wherein the drive unit is further comprised of a fluid driven motor coupled to the drive shaft.

14. The apparatus according to claim 11 wherein the housing further includes a support bearing attached to the housing and coupled to the drive shaft.

15. The apparatus according to claim 1 wherein the bypass line is further comprised of a valve.

16. The apparatus according to claim 1 wherein the drive unit is further comprised of an electric motor that simultaneously drives the filter assembly and the pump.

17. The apparatus according to claim 1 wherein the housing is further comprised of a substantially rigid polymer material.

18. A rotary filtration apparatus for the multistage filtering of an abrasive polishing slurry contained within a storage volume, comprising:

an elongated inner filter assembly having a first end, a first longitudinal central axis of rotation, a second end, and a substantially cylindrical first filter surface with a first controlled porosity positioned therebetween to define a first interior volume, the inner filter assembly further having a first diameter;

an elongated outer filter assembly having a first end, a second longitudinal central axis of rotation, a second end, and a substantially cylindrical second filter surface with a second controlled porosity positioned therebetween to define a second interior volume, the outer filter assembly having a second diameter larger than the first diameter;

a substantially cylindrical elongated housing having an inlet opening, an outlet opening, a bypass opening, an intermediate inlet opening and an intermediate outlet opening and further having an internal cavity with a third diameter larger than the first or second diameters, the outer filter assembly being positioned within the internal cavity and accommodated within the cavity, and the inner filter assembly being positioned within the second interior volume of the outer filter assembly and accommodated within the cavity with the first longitudinal axis substantially parallel to the second longitudinal axis to define an intermediate annular volume between the inner and the outer filter assembly within the cavity, and an annular volume between the outer filter assembly and the housing, and having the first interior volume in fluid communication with the inlet opening through the first end of the outer filter assembly and the first end of the inner filter assembly, the bypass opening in fluid communication with the first interior volume through the second end of the outer filter assembly and the second end of the inner filter assembly, the intermediate inlet opening being in fluid communication with the intermediate annular volume through the first end of the outer filter assembly and the intermediate outlet opening being in fluid communication with the intermediate annular volume through the second end of the outer filter assembly, and the outlet opening being in fluid communication with the annular volume;

a drive unit structured to rotate the inner filter assembly and the outer filter assembly capable of rotating the inner filter assembly and the outer filter assembly within the housing about an axis of rotation substantially parallel to the first and second axes of rotation, the inner filter assembly being rotated with a prescribed first angular velocity, and the outer filter assembly being rotated with a prescribed second angular velocity;

a bypass line in fluid communication with the bypass opening and the storage volume to transport slurry therebetween;

a intermediate line in fluid communication with the intermediate outlet opening and the intermediate inlet opening to transport slurry therebetween;

a supply line in fluid communication with the storage volume and the inlet opening; and a pump positioned in the supply line to transport the slurry from the source of the polishing slurry to the inlet opening of the housing.

19. The apparatus according to claim 18 wherein the first and second cylindrical filter surfaces are further comprised of a polymeric material.

20. The apparatus according to claim 19 wherein the polymeric material is polypropylene.

21. The apparatus according to claim 19 wherein the inner filter assembly is further comprised of a plurality of longitudinal support members positioned between the first end and the second end.

22. The apparatus according to claim 19 wherein the outer filter assembly is further comprised of a plurality of longitudinal support members positioned between the first end and the second end.

23. The inner filter assembly according to claim 19 wherein the first and second ends are further comprised of a plurality of flow passages projecting through the first and second ends in a direction substantially parallel to the first longitudinal central axis of rotation.

24. The inner filter assembly according to claim 23 wherein the first and second ends are further comprised of a sealing element concentrically disposed on the first and second members.

25. The inner filter assembly according to claim 24 wherein the sealing element is comprised of an elastomeric o-ring.

26. The inner filter assembly according to claim 24 wherein the sealing element is comprised of a labyrinth fluid seal.

27. The outer filter assembly according to claim 19 wherein the first and second ends are further comprised of a first plurality of flow passages projecting through the first and second ends and located within a radial distance approximately equal to one-half the first diameter, and a second plurality of flow passages projecting through the first and second ends and located outside the radial distance, the first and second plurality of flow passages projecting through the first and second members in a direction substantially parallel to the second longitudinal axis of rotation.

28. The outer filter assembly according to claim 19 wherein the first and second ends are further comprised of a first sealing element concentrically disposed on the first and second ends and located within a radial distance approximately equal to one-half the first diameter, and a second sealing element concentrically disposed on the first and second ends and located outside the radial distance.

29. The outer filter assembly according to claim 28 wherein the first and second sealing element is comprised of an elastomeric o-ring.

30. The outer filter assembly according to claim 28 wherein the first and second sealing element is comprised of a labyrinth fluid seal.

31. The apparatus according to claim 18 wherein the first controlled porosity is larger than the second controlled porosity.

32. The apparatus according to claim 31 wherein the second controlled porosity is greater than about 0.01 micron.

33. The apparatus according to claim 18 wherein the drive unit is further comprised of a first radial disk magnet fixedly attached to the inner filter assembly that magnetically couples to a first magnetic drive, and a second radial disk magnet fixedly attached to the outer filter assembly that magnetically couples to a second magnetic drive.

34. The apparatus according to claim 18 wherein the inner filter assembly is further comprised of a first drive shaft fixedly coupled to the second end of the inner filter assembly, and the outer filter assembly is further comprised of a second drive shaft fixedly connected to the second end of the outer filter assembly, the first drive shaft projecting through and located concentrically within the second drive shaft.

35. The apparatus according to claim 34 wherein the drive unit is further comprised of a motor and a transmission, the motor being coupled to the transmission, and the transmission being coupled to the first and second drive shafts.

36. The apparatus according to claim 18 wherein the first angular velocity is opposite in direction to the second angular velocity.

37. The apparatus according to claim 18 wherein the bypass line is further comprised of a valve.

38. The apparatus according to claim 18 wherein the intermediate line is incorporated into the housing.

39. The apparatus according to claim 18 wherein the intermediate line is further comprised of a pump.

40. The apparatus according to claim 18 wherein the intermediate line is further comprised of a valve.

41. The apparatus according to claim 18 wherein the drive unit is an electric motor that simultaneously drives the inner filter assembly and the outer filter assembly through a transmission and also simultaneously drives the pump.

42. The apparatus according to claim 18 wherein the housing is further comprised of a rigid polymer material.

43. A method for filtering a polishing slurry, comprising:
   introducing an unfiltered slurry stream into a substantially cylindrical filter assembly having a central longitudinal axis of rotation that includes a filter material of controlled porosity;
   rotating the filter assembly about the axis of rotation to generate a shear layer adjacent to the filter material;
   passing a first fraction of the slurry through the filter material to obtain a filtered slurry; and
   bypassing a second fraction of the slurry from the filter assembly.

44. The method according to claim 42 wherein the step of bypassing includes bypassing a second fraction that is 1–10% of the unfiltered slurry stream.

45. The method according to claim 42 wherein the step of introducing is further comprised of supplying the unfiltered slurry stream with the prescribed pressure provided by a pump.

46. The method according to claim 43 wherein the step of bypassing a second fraction of the slurry further comprises combining the second fraction with the unfiltered slurry.

47. The method according to claim 46 wherein the step of combining is further comprised of combining the second fraction of the slurry with the unfiltered slurry in a storage tank.

48. The method according to claim 42 wherein the step of passing a first fraction of the slurry through the filter material is further comprised of passing abrasive particles with a particle size that is less than the size of the controlled porosity.

49. The method according to claim 42 wherein the step of rotating is further comprised of generating a particle distribution layer adjacent to the filter material.

50. The method according to claim 48 wherein the particle distribution is further comprised of particles of size substantially about 0.01 micron adjacent to the filter material.

* * * * *

UNITED STATES PATENT AND TRADEMARK OFFICE
CERTIFICATE OF CORRECTION

PATENT NO.   : 6,475,071 B1                                                                          Page 1 of 1
DATED            : November 5, 2002
INVENTOR(S)  : Michael J. Joslyn It is certified that error appears in the above-identified patent and that said Letters Patent is hereby corrected as shown below:

Column 3,
Line 23, "accordance an" should read -- accordance with an --
Line 35, "element 24" should read -- element 24 --

Column 4,
Line 21, "that is a substantially" should read -- that is substantially --
Line 31, "metal," should read -- metal --
Line 34, "to form he struc-" should read -- to form the struc- --

Column 5,
Line 27, "elongated filter" should read -- an elongated filter --

Column 12,
Lines 52, 55 and 65, "claim 42" should read -- claim 43 --

Column 13,
Line 3, "claim 42" should read -- claim 43 --

Column 14,
Line 1, "claim 48" should read -- claim 49 --

Signed and Sealed this

Ninth Day of September, 2003

JAMES E. ROGAN
*Director of the United States Patent and Trademark Office*